April 14, 1936. W. E. KIDDER 2,037,076
SLED
Filed May 5, 1934 2 Sheets-Sheet 1
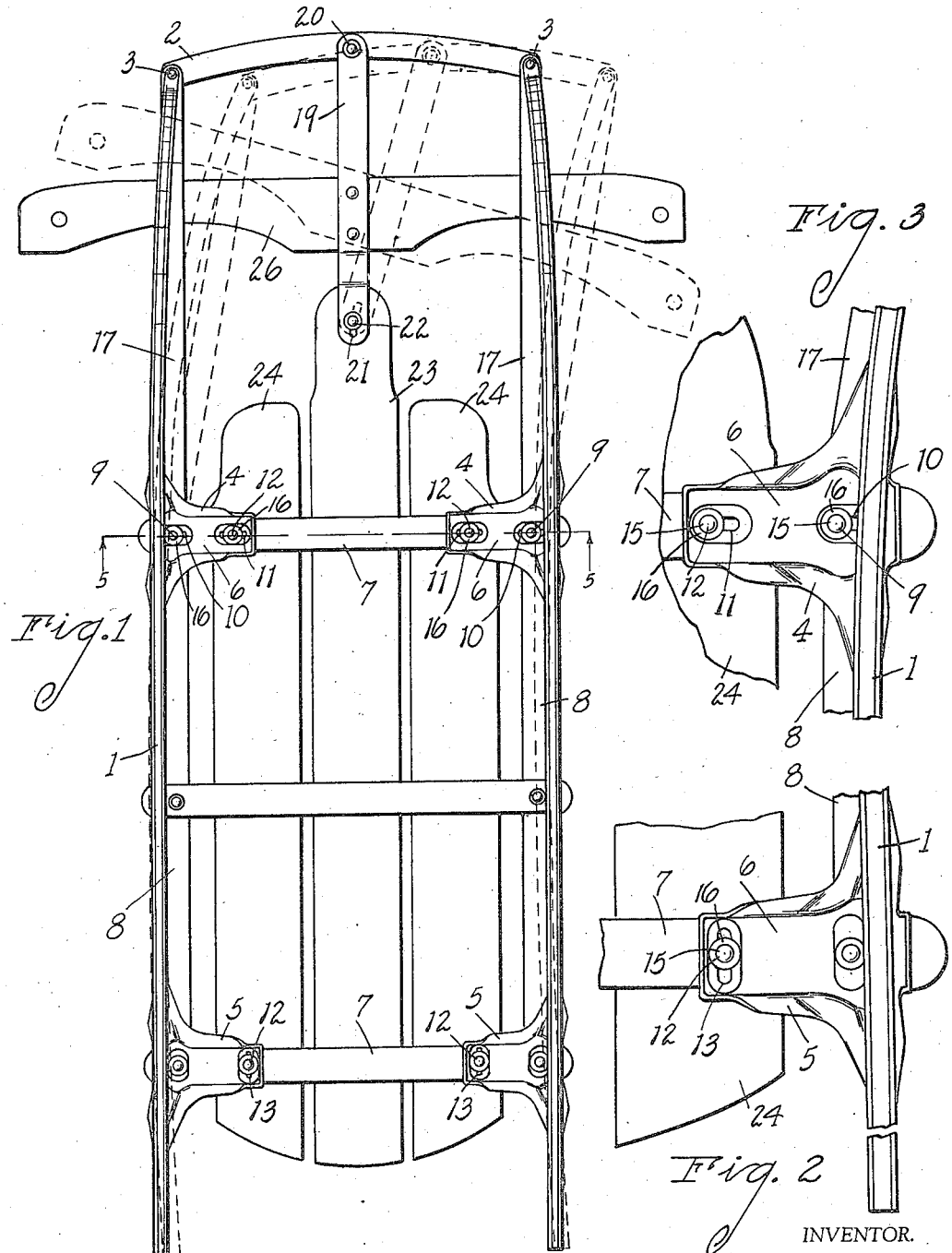
INVENTOR.
William E. Kidder
BY Chappell Earl
ATTORNEYS April 14, 1936.  W. E. KIDDER  2,037,076
SLED
Filed May 5, 1934  2 Sheets-Sheet 2

INVENTOR.
William E. Kidder
BY Chappell Earl
ATTORNEYS

Patented Apr. 14, 1936

2,037,076

UNITED STATES PATENT OFFICE 2,037,076

SLED

William E. Kidder, Kalamazoo, Mich., assignor to The Kalamazoo Sled Company, Kalamazoo, Mich.

Application May 5, 1934, Serial No. 724,047

13 Claims. (Cl. 280—22)

The main objects of this invention are:

First, to provide an improved sled of the steering or coaster type in which the runners may be deflected or curved with comparatively little effort and to a substantially greater degree than has been possible heretofore, the runners returning in all cases to their normal position regardless of the degree of flexure or curvature thereof.

Second, to provide a sled of this character which is simple and economical in its parts and very efficient and effective in operation.

Third, to provide a steering sled having means associated therewith for obviating side sway and which may be steered without materially retarding the speed thereof.

Objects relating to details and economies of my invention will appear from the description to follow. The invention is defined and pointed out in the claims.

A structure which is a preferred embodiment of my invention is illustrated in the accompanying drawings, in which:

Fig. 1 is a bottom view of my sled in normal position, one turning or steering position of the sled being indicated by dotted lines.

Fig. 2 is an enlarged fragmentary bottom view showing one of the rear knees in one turning or steering position.

Fig. 3 is an enlarged fragmentary bottom view of one of the front knees in one steering or turning position.

Figure 5:
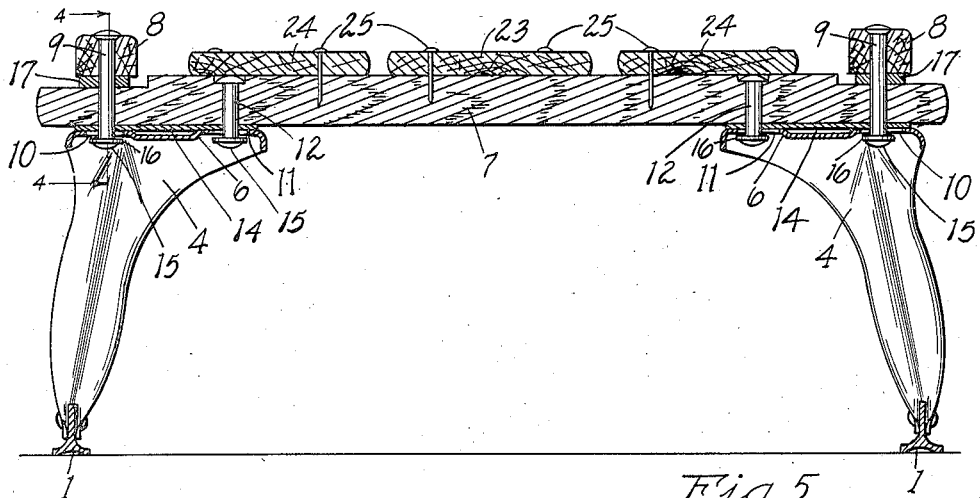
Fig. 5 is a transverse section of the sled taken on a line corresponding to line 5—5 of Figs. 1 and 4.

In the embodiment of my invention illustrated by Figs. 1 to 5, inclusive, of the drawings, the runners 1, 1 of substantially T cross section are bent upwardly at their front ends and connected by the cross bar 2, the connections of these parts being by means of pivots 3, 3. The front knees 4, 4 and rear knees 5, 5 are provided with downwardly diverging legs which are secured to the runners as illustrated. The knees have inwardly projecting bracket portions 6 forming seats for the benches 7. The raves 8, 8 are fixedly mounted on the benches adjacent their outer ends.

The benches and raves are connected by the rivets or bolts 9 which also engage outer longitudinal slots 10 formed in the front knees and round holes formed in the rear knees, the round holes not being shown. The front knees have inner longitudinal slots 11 which are engaged by the headed studs 12. The rear knees have inner transverse slots 13 which are engaged by the headed studs 12. This permits a very desirable movement of the knees relative to the benches when the runners are flexed as illustrated by the dotted lines of Fig. 1 and also permits a very easy flexing of the runners through the length thereof.

In order to facilitate such movement, I dispose antifriction bearing plates 14 between the benches and the bracket portions of the knees. These bearing plates are preferably of steel and act also to reinforce and strengthen the benches which are preferably of wood.

In order to obviate side sway and to provide a certain amount of friction between the lower ends of the studs and bolts and the bracket portions of the knees, I spin over the lower ends of the studs and bolts to provide annular flanges 15 and dispose friction washers 16 between the knees and said annular flanges. These washers engage the knees as shown by Fig. 5, the washer and knee being shown in spaced relation by Fig. 4 for convenience of illustration.

Figure 4:
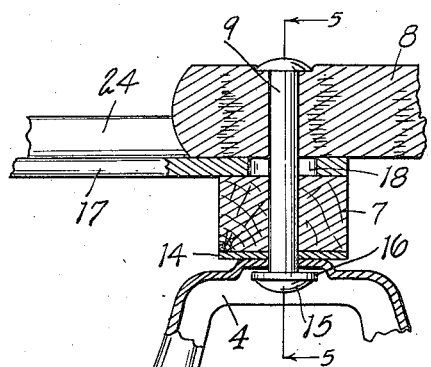
Fig. 4 is an enlarged fragmentary view mainly in side elevation of one of the front knees, portions being broken away and shown in section on a line corresponding to line 4—4 of Fig. 5.

The links 17 are pivotally engaged with the rivets 9 connecting the front bench to the raves and with the front ends of the runners by the pivots 3. The rear ends of the links are provided with longitudinal slots 18 coacting with the bolts or rivets 9 as shown by Fig. 4.

The steering lever 19 is pivotally connected to the cross bar 2 at 20 and has a longitudinal slot 21 engaging the pivot 22 on the forward end of the center board 23 of the top. This top board and the top boards 24, 24 disposed at each side thereof are rigidly secured to the front and rear benches by means of the fastenings 25. The steering lever 19 is provided with a steering bar 26 for deflecting the forward ends of the runners when turned as illustrated by the dotted lines of Fig. 1.

With this arrangement of parts, the runners may be flexed or curved substantially uniformly throughout their length, thus allowing that portion of them sustaining the load to curve and effectively steer the sled. Owing to my use of the bearing plates between the benches and the knees, the runners are easily flexed and the sled turned in a relatively short radius, the washers between the lower ends of the studs and bolts and the knees acting to prevent side sway and lack of friction between the parts.

Figure 6:
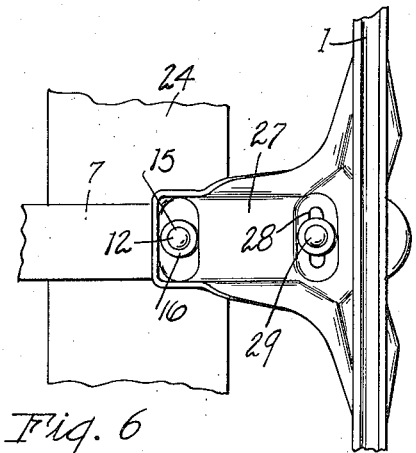
Fig. 6 is a fragmentary bottom view of a modification of the rear knee construction.

While I prefer to use an outer pivot and an inner pin and slot connection between the rear bench and the rear knees as shown by Fig. 2, if desired this arrangement may be reversed as illustrated by Fig. 6 wherein the rear knee 27 is provided with an outer transverse slot 28 coacting with the bolt or rivet 29 and an inner round hole (not shown) coacting with the headed stud 12. The construction illustrated by Fig. 2 is preferred over that illustrated by Fig. 6 for the reason that the former works more perfectly than the latter.

When the sled is made in the three-, or more, bench size, longitudinal slots are used on the front and center knees, everything else being the same as in the two-bench size described.

With my construction, the raves may be made as stout as desired owing to the extreme flexibility of the runners and knees. It is to be understood, however, that my invention is applicable to constructions wherein the raves are adapted to flex in steering the sled, the top not being rigidly secured to the benches in such sleds.

I have illustrated and described my improvements in embodiments which I have found very practical. I have not attempted to illustrate or describe other embodiments or adaptations, as it is believed this disclosure will enable those skilled in the art to embody or adapt my improvements as may be desired.

Having thus described my invention, what I claim as new and desire to secure by Letters Patent is:

1. In a sled, the combination with flexible runners, of pairs of front and rear knees secured to said runners, the front knees each having longitudinally spaced inner and outer longitudinal slots therein, and the rear knees each having an outer round hole and an inner transverse slot therein, benches arranged on said knees, anti-friction bearing plates disposed between said benches and said knees, raves disposed on said benches adjacent their ends, bolts connecting said raves and benches, the bolts being arranged through the outer slots and outer holes of said knees, headed studs on said benches arranged through the inner slots of said knees, the lower ends of said bolts and studs being spun over to provide annular flanges, and friction washers disposed on said studs and bolts between said knees and said annular flanges, a top rigidly secured to said benches, a cross bar connecting the front ends of said runners, links pivotally connecting the front ends of said cross bar and to the front bench, the rear ends of the links having longitudinal slots coacting with the front bolts, and a steering lever pivotally mounted on said cross bar and having a pin and slot connection to the front end of said top.

2. In a sled, the combination with flexible runners, of pairs of front and rear knees secured to said runners, the front knees each having longitudinally spaced inner and outer longitudinal slots therein, and the rear knees each having an outer round hole and an inner transverse slot therein, benches arranged on said knees, raves disposed on said benches adjacent their ends, bolts connecting said raves and benches, the bolts being arranged through the outer slots and outer holes of said knees, headed studs on said benches arranged through the inner slots of said knees, the lower ends of said bolts and studs being spun over to provide annular flanges, and friction washers disposed on said studs and bolts between said knees and said annular flanges, a top rigidly secured to said benches, a cross bar connecting the front ends of said runners, links pivotally connecting the front ends of said cross bar and to the front bench, the rear ends of the links having longitudinal slots coacting with the front bolts, and a steering lever pivotally mounted on said cross bar and having a pin and slot connection to the front end of said top.

3. In a sled, the combination with flexible runners, of pairs of front and rear knees secured to said runners, the front knees each having spaced inner and outer alined slots therein, and the rear knees each having an outer round hold and an inner transverse slot therein, benches arranged on said knees, raves disposed on said benches adjacent their ends, bolts connecting said raves and benches, the bolts being arranged through the outer slots and outer holes of said knees, headed studs on said benches arranged through the inner slots of said knees, a top rigidly secured to said benches, a cross bar connecting the front ends of said runners, links pivotally connecting the front ends of said cross bar and to the front bench, the rear ends of the links having longitudinal slots coacting with the front bolts, and a steering lever pivotally mounted on said cross bar and having a pin and slot connection to the front end of said top.

4. In a sled, the combination with flexible runners, of pairs of front and rear knees secured to said runners, the knees each having longitudinally spaced inner and outer openings therein, benches arranged on said knees, anti-friction bearing plates disposed between said benches and said knees, raves disposed on said benches adjacent their ends, bolts connecting said raves and benches, the bolts being arranged through the outer openings of said knees, headed studs on said benches arranged through the inner openings of said knees, the lower ends of said bolts and studs having annular flanges, and friction washers disposed on said studs and bolts between said knees and said annular flanges.

5. In a sled, the combination with flexible runners, of pairs of front and rear knees secured to said runners, the knees each having longitudinally spaced inner and outer openings therein, benches arranged on said knees, anti-friction bearing plates disposed between said benches and said knees, raves disposed on said benches adjacent their ends, bolts connecting said raves and benches, the bolts being arranged through the outer openings of said knees, and headed studs on said benches arranged through the inner openings of said knees.

6. In a sled, the combination with flexible runners, of pairs of front and rear knees secured to said runners, the front knees each having longitudinally spaced inner and outer longitudinal slots therein, benches arranged on said knees, anti-friction bearing plates disposed between said benches and said front knees, raves disposed on said benches adjacent their ends, bolts connecting said raves and benches, the bolts being arranged through the outer slots of said front knees, headed studs on said benches arranged through the inner slots of said front knees, the lower ends of said bolts and studs being spun over to provide annular flanges, and friction washers disposed on said studs and bolts between said knees and said annular flanges, a top rigidly secured to said benches, a cross bar connecting the front ends of said runners, links pivotally connecting the front ends of said cross bar and to the front bench, the rear ends of the links having enlarged openings coacting with the front bolts, and a steering lever pivotally mounted on said cross bar and having a pin and slot connection to the front end of said top.

7. In a sled, the combination with flexible runners, of pairs of front and rear knees secured to said runners, the front knees each having longitudinally spaced inner and outer longitudinal slots therein, benches arranged on said knees, anti-friction bearing plates disposed between said benches and said front knees, raves disposed on said benches adjacent their ends, bolts connecting said raves and benches, the bolts being arranged through the outer slots of said front knees, headed studs on said benches arranged through the inner slots of said front knees, a top rigidly secured to said benches, a cross bar connecting the front ends of said runners, links pivotally connecting the front ends of said cross bar and to the front bench, the rear ends of the links having enlarged openings coacting with the front bolts, and a steering lever pivotally mounted on said cross bar and having a pin and slot connection to the front end of said top.

8. In a sled, the combination with flexible runners, of pairs of front and rear knees secured to said runners, the front knees each having spaced inner and outer alined slots therein, benches arranged on said knees, raves disposed on said benches adjacent their ends, bolts connecting said raves and benches, the bolts being arranged through the outer slots of said front knees, headed studs on said benches arranged through the inner slots of said front knees, a top rigidly secured to said benches, a cross bar connecting the front ends of said runners, links pivotally connecting the front ends of said cross bar and to the front bench, the rear ends of the links having enlarged openings coacting with the front bolts, and a steering lever pivotally mounted on said cross bar and having a pin and slot connection to the front end of said top.

9. In a sled, the combination with flexible runners, of pairs of front and rear knees secured to said runners, the front knees each having spaced inner and outer alined slots therein, benches arranged on said knees, raves disposed on said benches adjacent their ends, bolts connecting said raves and benches, the bolts being arranged through the outer slots of said front knees, and headed studs on said benches arranged through the inner slots of said front knees.

10. In a sled, the combination with flexible runners, of pairs of front and rear knees secured to said runners, the front knees each having longitudinally spaced inner and outer longitudinal slots therein, and the rear knees each having an inner pivot hole and an outer transverse slot therein, benches arranged on said knees, anti-friction bearing plates disposed between said benches and said knees, raves disposed on said benches adjacent their ends, bolts connecting said raves and benches, the bolts being arranged through the outer slots of said knees, headed studs on said benches arranged through the inner slots and inner holes of said knees, the lower ends of said bolts and studs being spun over to provide annular flanges, and friction washers disposed on said studs and bolts between said knees and said annular flanges, a top on said benches, a cross bar connecting the front ends of said runners, links pivotally connecting the front ends of said cross bar and to the front bench, the rear ends of the links having longitudinal slots coacting with the front bolts, and a steering lever pivotally mounted on said cross bar and having a pin and slot connection to the front end of said top.

11. In a sled, the combination with flexible runners, of pairs of front and rear knees secured to said runners, the front knees each having spaced inner and outer alined slots therein, and the rear knees each having an inner pivot hole and an outer transverse slot therein, benches arranged on said knees, raves disposed on said benches adjacent their ends, bolts connecting said raves and benches, the bolts being arranged through the outer slots of said knees, headed studs on said benches arranged through the inner slots and inner holes of said knees, a top on said benches, a cross bar connecting the front ends of said runners, links pivotally connecting the front ends of said cross bar and to the front bench, the rear ends of the links having longitudinal slots coacting with the front bolts, and a steering lever pivotally mounted on said cross bar and having a pin and slot connection to the front end of said top.

12. In a sled, the combination with flexible runners, of pairs of front and rear knees secured to said runners, the front knees each having longitudinally spaced inner and outer longitudinal slots therein, benches arranged on said knees, anti-friction bearing plates disposed between said benches and said front knees, raves disposed on said benches adjacent their ends, bolts connecting said raves and benches, the bolts being arranged through the outer slots of said front knees, headed studs on said benches arranged through the inner slots of said front knees, the lower ends of said bolts and studs having annular flanges, and friction washers disposed on said studs and bolts between said knees and said annular flanges, a top on said benches, a cross bar connecting the front ends of said runners, links pivotally connecting the front ends of said cross bar and to the front bench, the rear ends of the links having pivot openings coacting with the front bolts, and a steering lever pivotally mounted on said cross bar and having a pin and slot connection to the front end of said top.

13. In a sled, the combination with flexible runners, of pairs of front and rear knees secured to said runners, the front knees each having spaced inner and outer slots therein, benches arranged on said knees, anti-friction bearing plates disposed between said benches and said front knees, raves disposed on said benches adjacent their ends, bolts connecting said raves and benches, the bolts being arranged through the outer slots of said front knees, headed studs on said benches arranged through the inner slots of said front knees, a top on said benches, a cross bar connecting the front ends of said runners, links pivotally connecting the front ends of said cross bar and to the front bench, the rear ends of the links having pivot openings coacting with the front bolts, and a steering lever pivotally mounted on said cross bar and having a pin and slot connection to the front end of said top.

WILLIAM E. KIDDER.